(12) United States Patent
Hertz et al.

(10) Patent No.: US 8,157,097 B2
(45) Date of Patent: *Apr. 17, 2012

(54) SYSTEM AND METHOD FOR PROVIDING AUDIO CONTENT TO A PERSON

(75) Inventors: Kenneth B. Hertz, Beverly Hills, CA (US); David W. Schultze, Beverly Hills, CA (US); Jemmy Chi-Keung Fung, Hong Kong (CN)

(73) Assignee: Membrain, LLC, Beverly Hills, CA (US)

( * ) Notice: Subject to any disclaimer, the term of this patent is extended or adjusted under 35 U.S.C. 154(b) by 1216 days.

This patent is subject to a terminal disclaimer.

(21) Appl. No.: 11/544,995

(22) Filed: Oct. 5, 2006

(65) Prior Publication Data
US 2008/0084795 A1 Apr. 10, 2008

(51) Int. Cl.
*B65D 1/34* (2006.01)
*H04R 1/02* (2006.01)
*H04R 9/06* (2006.01)

(52) U.S. Cl. ........... 206/557; 381/87; 381/333; 381/334

(58) Field of Classification Search .................... 381/77, 381/87, 333–334; 206/557; 220/574–575
See application file for complete search history.

(56) References Cited

U.S. PATENT DOCUMENTS

| | | |
|---|---|---|
| 3,971,889 A | 7/1976 | Hays |
| 4,279,342 A | 7/1981 | Van Pelt |
| 4,571,740 A | 2/1986 | Kirby |
| 4,792,994 A | 12/1988 | Aylward |
| 4,867,187 A | 9/1989 | Divine |
| 5,070,539 A | 12/1991 | Cheng |
| 5,582,478 A | 12/1996 | Ambrosino |
| 5,810,168 A | 9/1998 | Eggering |
| 5,823,329 A | 10/1998 | Roberts |
| 5,881,156 A * | 3/1999 | Treni et al. ...................... 381/91 |
| 5,946,343 A | 8/1999 | Schotz |
| 6,778,813 B1 | 8/2004 | Lilly |
| 2003/0036039 A1 | 2/2003 | Parker |
| 2005/0256774 A1 | 11/2005 | Clothier |

FOREIGN PATENT DOCUMENTS

JP 2002320296 A 10/2002

OTHER PUBLICATIONS

U.S. Appl. No. 11/696,026, filed Apr. 3, 2007, Hertz et al.
Office Action dated Jan. 4, 2011 from U.S. Appl. No. 11/696,026.
Office Action dated Sep. 2, 2010 from U.S. Appl. No. 11/696,026.

* cited by examiner

*Primary Examiner* — Devona Faulk
*Assistant Examiner* — George Monikang
(74) *Attorney, Agent, or Firm* — Workman Nydegger

(57) ABSTRACT

Described herein is a serving tray having an audio player associated therewith. In a preferred embodiment, the serving tray includes an item supporting portion having a periphery, and a wall extending upwardly from at least a portion of the periphery of the item supporting portion. In other preferred embodiments, the audio player of the serving tray includes a receiver and/or memory for storing digital content.

13 Claims, 6 Drawing Sheets

SYSTEM AND METHOD FOR PROVIDING AUDIO CONTENT TO A PERSON

FIELD OF THE INVENTION

The present invention relates generally to a system and method for providing audio content to a person, and more particularly, to a serving tray that provides audio content to a person.

BACKGROUND OF THE INVENTION

Conventionally, when a customer orders food at a fast food restaurant they are given a tray for carrying their food to a table. The tray typically provides no other function other than a support surface for carrying the food. Fast food chains are always looking for new ways to attract customers to their restaurant. One way to attract customers is to provide the customer with a choice for what type of music they can listen to while eating in the restaurant. The present invention addresses this need by providing the ability to listen to music or the like while the customer is enjoying food at a table in the restaurant. One solution is to provide a tray that emits the music or the like.

SUMMARY OF THE PREFERRED EMBODIMENTS

In accordance with a first aspect of the present invention, there is provided a serving tray having an audio player associated therewith. In a preferred embodiment, the serving tray includes an item supporting portion having a periphery, and a wall extending upwardly from at least a portion of the periphery of the item supporting portion. In other preferred embodiments, the audio player of the serving tray includes a receiver and/or memory for storing digital content.

In accordance with another aspect of the present invention there is provided a method of being provided audio content while in a restaurant. The method includes the steps of ordering and receiving food, receiving a portable audio device, taking the food and the portable audio device to a table, listening to the audio content using the portable audio device, and leaving the restaurant without the portable audio device. In a preferred embodiment, the portable audio device is a tray on which the food is placed. In another preferred embodiment, the method also includes the step of providing a transmitter that transmits the audio content at at least a first frequency and the portable audio device includes a receiver for receiving the audio content.

In accordance with another aspect of the present invention there is provided a food tray system that includes a tray having a flat surface, a sound emitting device, and a food item. Preferably, the the sound emitting device is disposed in the tray.

In accordance with yet another aspect of the present invention there is provided a tray recharging system that includes at least two trays and a recharging stand. The two trays each include first and second sets of contacts and a rechargeable battery. In a preferred embodiment, the first set of contacts is in electrical communication with the rechargeable battery and the second set of contacts.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The present invention provides a system and method for providing audio content to restaurant customers by way of a portable audio device 100. The system provides a way for customers to listen to music or other audio while enjoying their food in the restaurant.

For exemplary purposes only, described hereinbelow are preferred embodiments wherein the portable audio device 100 of the present invention is embodied in a fast food restaurant serving tray that includes a sound emitting device or audio player, such as an mp3 player, microcaster, radio or the like or a combination of audio players. However, it will be understood, that this is not a limitation on the present invention.

It will be appreciated that terms such as "front", "back," "top," "bottom" and "side" used hereinbelow are merely for ease of description and refer to the orientation of the components as shown in the figures. It should be understood that any orientation of the tray and the components thereof described herein is within the scope of the present invention.

Figure 1:
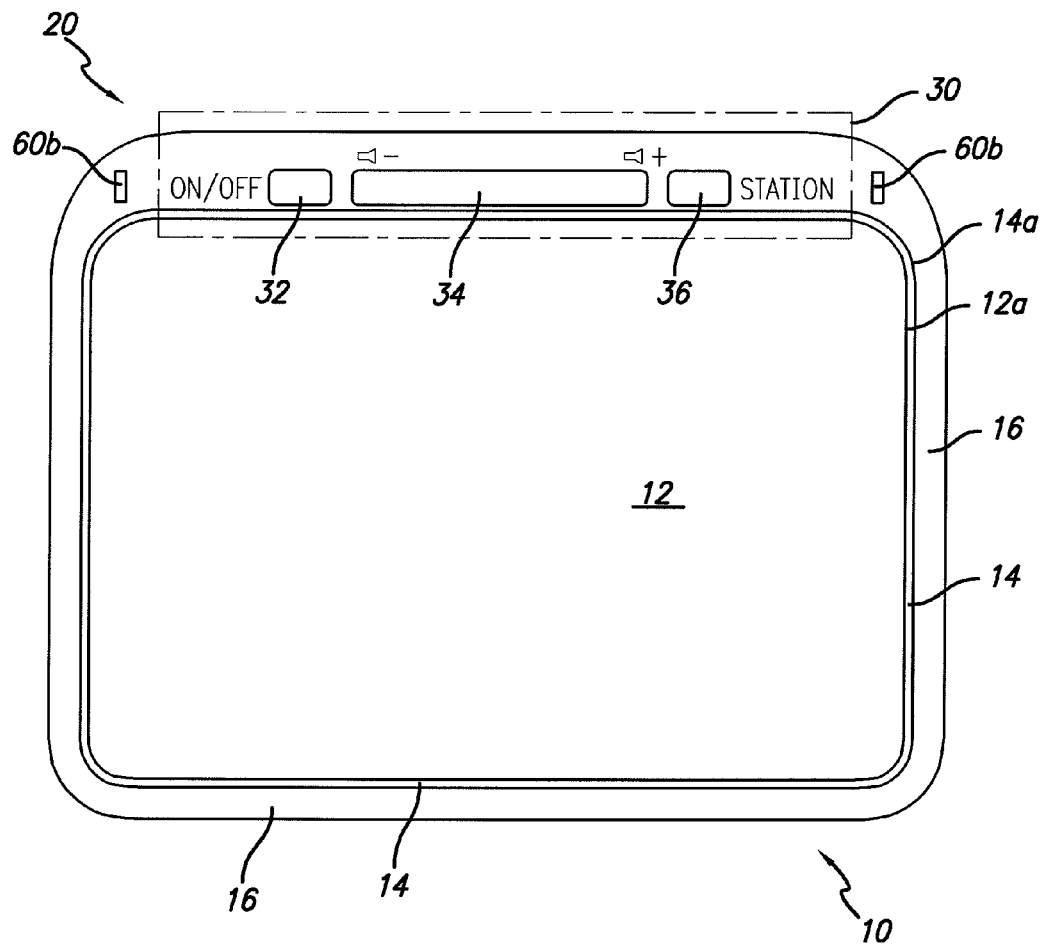
FIG. 1 is a top plan view of a tray in accordance with a preferred embodiment of the present invention.
Figure 2:
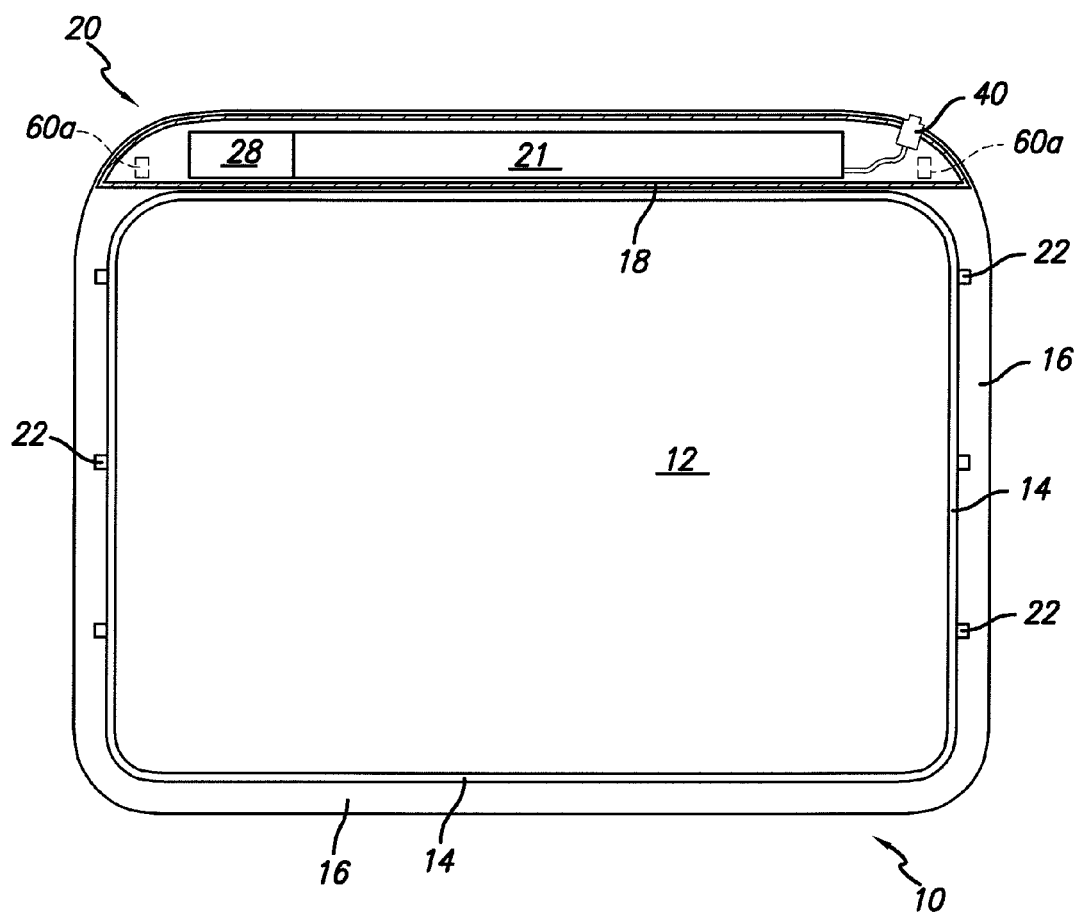
FIG. 2 is a bottom plan view of the tray of FIG. 1 with the electronics portion in cross-section to show the components therein.
Figure 3:
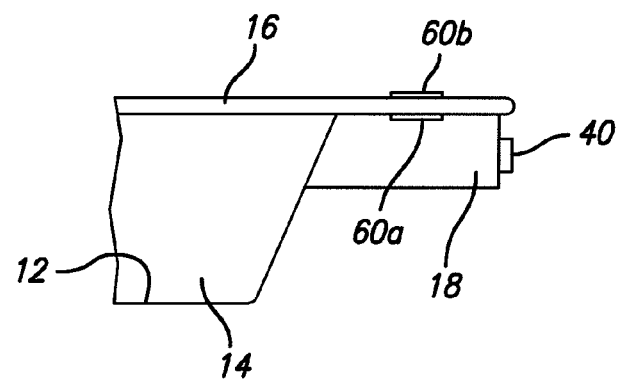
FIG. 3 is a partial side elevational view of a portion of the tray of FIG. 1.
Figure 4:
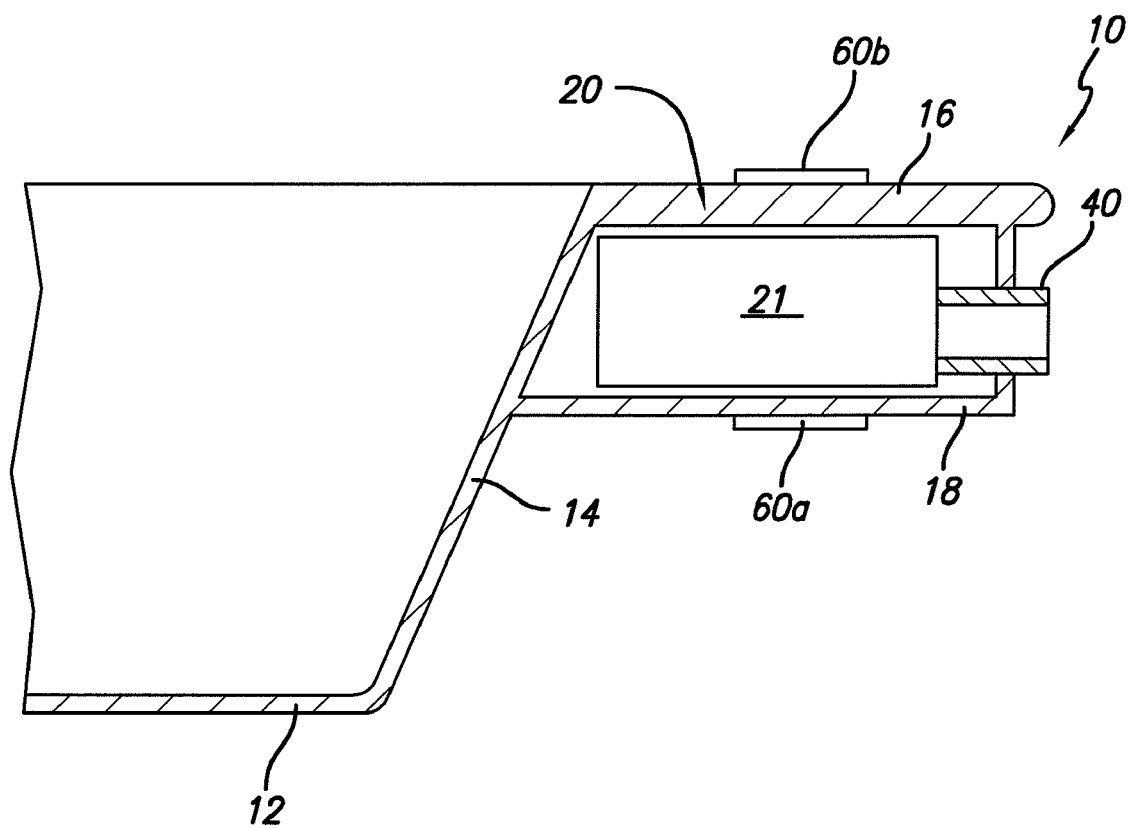
FIG. 4 is a cross-sectional view of FIG. 3.

A preferred embodiment of the present invention is shown in FIGS. 1-6. Generally, the tray 10 includes an item supporting portion 12, a wall 14, a flange 16 and an electronics portion 18. The wall 14 extends upwardly from a periphery 12a of the item supporting portion 12. In a preferred embodiment, the wall 14 extends upwardly at an angle from the item supporting portion 12, as is shown in FIGS. 3 and 4. Preferably, the flange 16 extends outwardly from a top edge 14a of the wall. In a preferred embodiment, the tray 10 also includes alignment feet 22 (for aligning stacked trays 10), as shown in FIG. 2.

The tray 10 can be made of any desirable material. For example, the tray 10 can be made of polypropylene, ABS or the like. The tray 10 can be molded as a single piece or different components can be heat welded to one another.

In a preferred embodiment, the tray 10 includes a sound emitting device or audio player 20. Any sound emitting device or audio player is within the scope of the present invention. In a preferred embodiment, the audio player 20 is housed in the electronics portion 18, as shown in FIGS. 2-4. The electronics portion 18 can be located anywhere on the tray 10, not just in the location shown in FIG. 4. For example, the electronics portion can be located on the item supporting portion 12. It will be understood that the electronics portion 18 is the portion of the tray that houses the audio player 20 and other electronics (described below) and does not have to be a separate portion of the tray. For example, the audio player 20 and other electronics or the components thereof can be housed in the flange 16, wall 14 or the item supporting portion 12 or different components can be housed in one or more of the flange 16, wall 14 or the item supporting portion 12. It should be understood that the invention is embodied in a serving tray that includes an audio player and that the type of tray or audio player, and the location of the components thereof, is not a limitation on the present invention.

As discussed above, the serving tray 10 can include any type of audio player 20, whether it be an mp3 player, microcaster, radio, CD player or the like. In a preferred embodiment, the player 20 includes any or all of the following components—memory, a microprocessor/microcontroller, integrated circuit, a digital signal processor or codec, a display, playback controls, an audio port or sound jack, an amplifier, filter, noise purifier and/or reducer, RF amp, mixer and a power supply. Those skilled in the art are familiar with the basic components of audio players and will be able to add or remove components as desired.

For exemplary purposes only, the tray will be described herein as including an audio player that has the capability of playing one or more preset stations that are broadcast from within or near the restaurant. It will be understood that this is not a limitation on the present invention.

Figure 6:
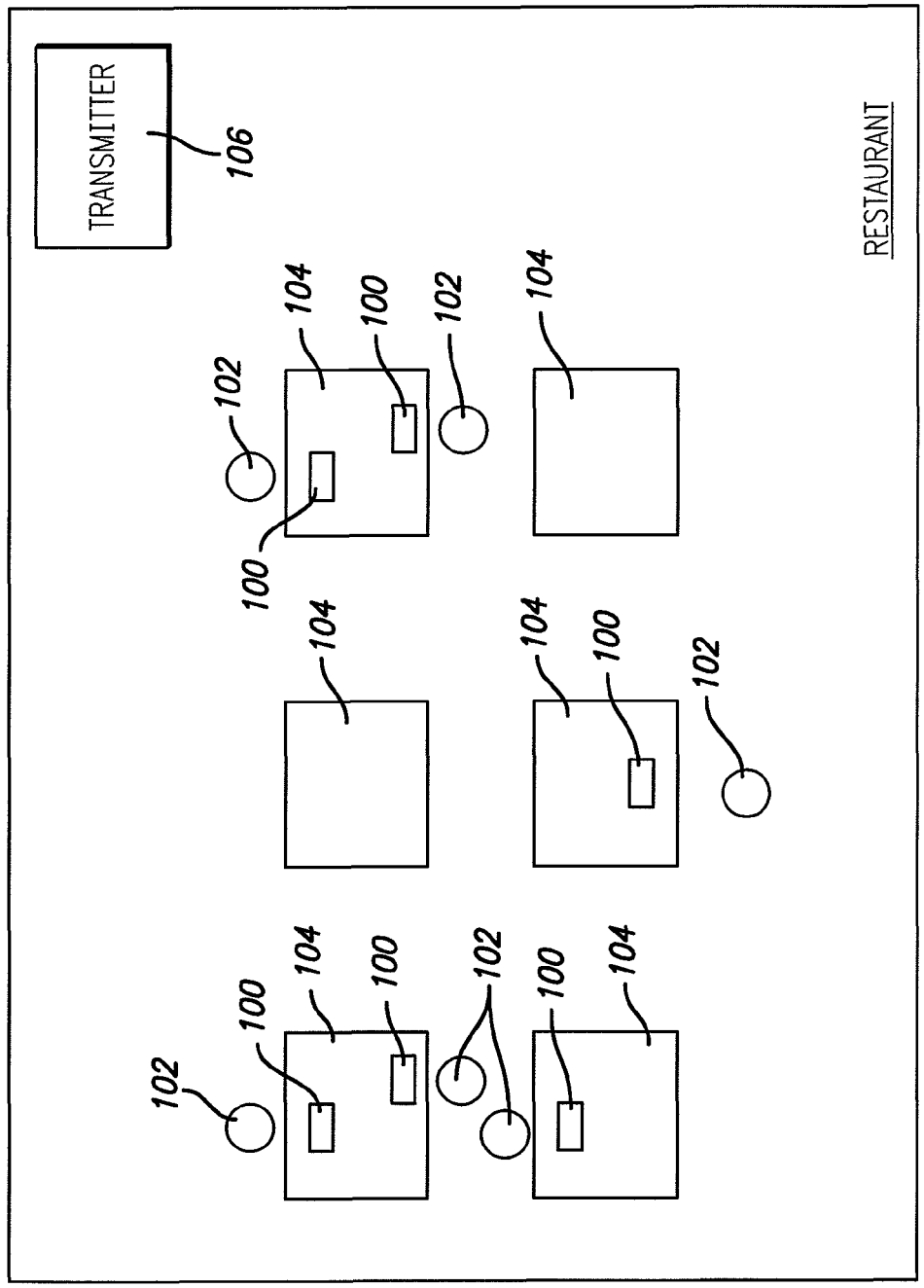
FIG. 6 is an top elevational view of a restaurant using a system for providing audio content to customers in accordance with a preferred embodiment of the present invention.

For example, the restaurant can have a local transmitter 106, as shown in FIG. 6, on the premises that transmits one or more frequencies of desired audio content (e.g., music, talk, advertising, etc.). The transmitter 106 can include audio content in any form known in the art, e.g., CD's cassette tapes, phonographs, or stored in memory, such as stored MP3s or the like. The tray 10 includes a receiver therein that receives the content and, in turn, transmits it to the customer (e.g., via headphones). The content may be transmitted on a higher frequency carrier (for example the 900 MHZ band) which carries programs or other information unique to the restaurant. U.S. Pat. No. 5,410,735, issued on Apr. 25, 1995 to Robert L. Borchardt, which is hereby incorporated by reference herein, is one example of a system that allows a user to listen to programs at a distance remote from a local transmitter.

The primary electrical components housed in the electronics portion 18 (most of which are included on a printed circuit board 21) may include a receiver for receiving an audio signal, a signal-processor for decoding digital audio signals to generate analog sound signals, and a microcontroller for controlling the entire system operation. The tray preferably includes a cover portion (not shown) for containing the printed circuit board (PCB) 21 and remainder of the "guts" or electronics. For simplicity in the figures, the electrical components described herein, such as the memory, microprocessor/microcontroller, digital signal processor or codec, amplifier, etc. are omitted, and the PCB 21 is shown.

As shown in FIG. 2, in an exemplary embodiment, the electronics portion 18 contains a power source 28, which is preferably a battery of sufficient voltage to power the audio player and controls for a desired number of hours of play. The battery may be rechargeable, such as a nickel-cadmium type rechargeable battery or the like, or the battery may be disposable. The electronics portion 18 or other portion may include a door that provides access to the battery for changing it. The power source 28 powers the electrical components, as necessary.

Figure 5:
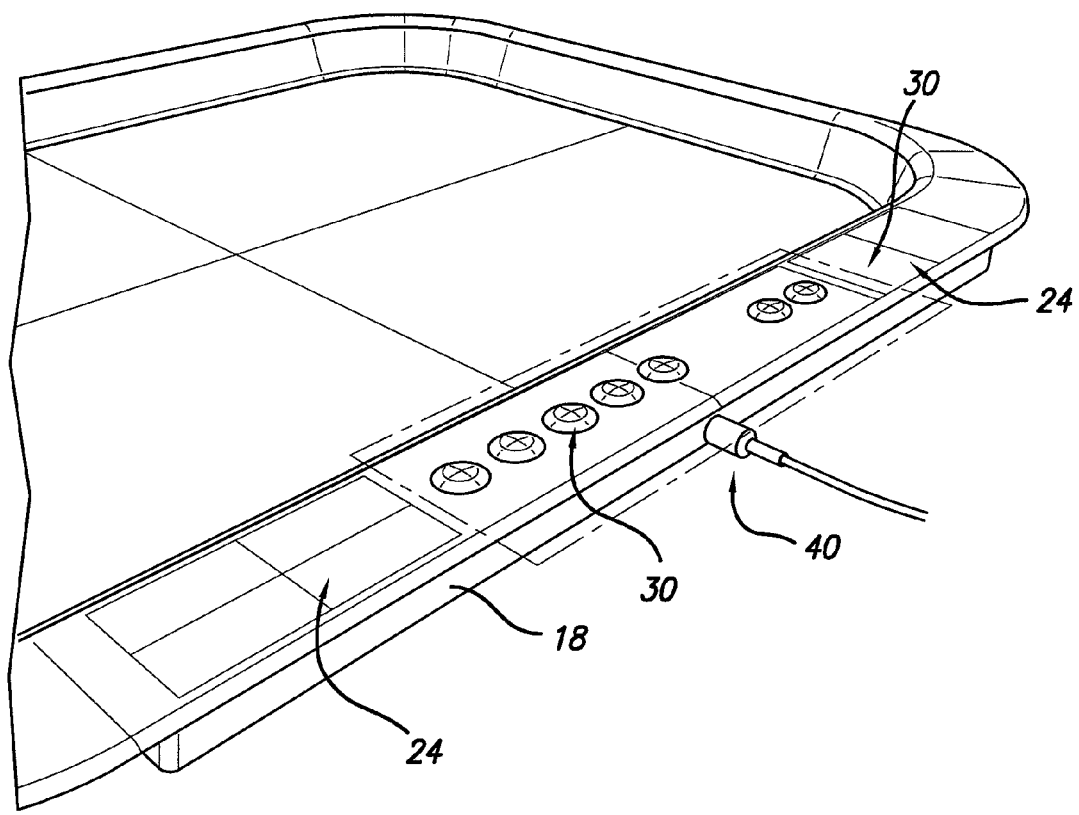
FIG. 5 is a partial perspective view of a tray in accordance with an embodiment of the invention.

The tray 10 may be adapted to plug into a wall outlet or USB port to recharge the battery or the power source 28 may be provided by an alternating current source, such as a wall outlet. However, it will be understood that the power source can also be a disposable battery, solar power or any other type of known power source. For example, FIG. 5 shows an embodiment of the tray 10 that includes solar panels 24.

The microcontroller is preferably a low power CMOS such as an 8-bit microcontroller based on RISC architecture. This achieves high throughputs while minimizing power consumption. However, other microcontrollers can also be used. It will be understood that the description above is only an example of the inner workings of the tray and audio player (and the components of the PCB). Those skilled in the art will be able to make numerous changes to how the audio player and it's components, such as the micronController, signal processor, memory, etc. work and interact.

As shown in FIG. 1, the tray 10 also includes a control portion 30. In a preferred embodiment, the control portion 30 includes at least one, and preferably a plurality of buttons, switches, touch sensitive pads or other devices for receiving human commands that are in electrical communication with the microcontroller 26. Any type of button, touch sensitive pad or the like known in the art can be used. For example, the buttons may be touch sensitive or only require a stroke of only a couple of millimeters to be actuated.

In a preferred embodiment, the tray 10 includes a number of user entered device control commands that are included in the control portion 30 and are controlled by the microcontroller 26. For example, the control portion 30 preferably includes a button 32 for controlling ON/OFF. The button 32 is in communication with the microcontroller 26. Preferably, the control portion 30 also includes a button, area or touch pad 34 for volume control and a button 36 for station selection.

The control portion 30 can alternatively include separate buttons for other functions, including, but not limited to, a graphic equalizer, play, pause, forward, reverse and other functions known by those skilled in the art. The volume regulator may be continuously variable or variable by steps such as low, medium and high. The volume regulator may also incorporate the power switch that turns the device on and off. Alternatively, the tray 10 may have a display, such as an LCD display, indication lights and/or other accessories. The length of time for which the buttons 32, 34 and/or 36 need to be pressed to actuate the different functions is predetermined. FIG. 5 shows an embodiment of the tray 10 that has a control portion 30 that includes separate buttons for volume and station selection.

As shown in FIGS. 2-5, tray 10 preferably includes at least one sound jack or earphone socket 40. In another embodiment a plurality of sound jacks can be included. Since a sound jack is well known to those skilled in the art, a detailed description thereof will be omitted herein. In another embodiment, the sound jack 40 can be used to recharge the battery if a rechargeable battery is used. In this embodiment, one end of the recharge chord can be plugged in to the sound jack, which is in electrical communication with the battery, and the other end of the recharge chord can be plugged in to a power source, such as a wall outlet or a USB port.

In another embodiment, tray 10 can include a set of headphones or speakers permanently attached thereto instead of providing a sound jack. The earphones and associated cord can be either retractable or non-retractable.

In another preferred embodiment, the audio player 20 can be a digital audio player or mp3 player as they are commonly known. In this embodiment, digital audio data is fed from memory through a signal processor, which generates analog sound signals that are provided to speakers or an audio port the sound jack. The signal processor is preferably an MPEG layer 3 audio decoder that includes a digital to analog converter or the like. It is also preferable for the decoder to have an earphone amplifier to eliminate the need for a separate amplifier in the player. However, a separate amplifier in the player can also be provided. A chip that contains a high-performance, low power digital signal processor core and high quality oversampling variable sample rate digital to analog converter is preferred.

In a preferred embodiment, the memory is non-erasable flash RAM. However, the non-erasable flash memory is presented as an example of a non-volatile memory module for storing digital audio data, but various non-volatile memory devices may be used, in addition to the non-erasable flash memory device. For example, the memory can also be ROM. Preferably, the memory is programmed during the manufacturing process, and, cannot be changed or erased by the end user. In an alternative embodiment, the memory can be erasable flash RAM or the like, such as a CompactFlash card, a SmartMedia card, a MultiMediaCard, a Memory Stick or an internal microdrive, or the memory can be interchangeable ROM.

Described below is an exemplary use of the tray 10 of the present invention in a restaurant. Initially, a customer enters the restaurant and places a food order. An employee fills the order, places the food on the tray 10 and gives the tray 10 with the food thereon to the customer. The customer then takes the tray 10 to a table, sits down and connects his/her headphones to the sound jack 40. Next, the customer pushes the on/off button 32 and begins listening to audio content. If so desired, the customer can choose between different stations by using the station button 36 or can adjust the volume using the volume button 34.

Other portable audio devices 100 for providing audio content to a restaurant customer are within the scope of the present invention. For example, in another embodiment, the restaurant can provide headphones that include a built in audio player or a built in receiver for receiving the audio content being locally transmitted within the restaurant. In this embodiment, the headphones would preferably be inexpensive and/or disposable such that a restaurant could provide them to a customer, and the customer could use them upon a single visit to the restaurant to listen to the audio content while enjoying his/her meal.

In another alternative embodiment, the portable audio device 100 can be embodied in a device that clips on or otherwise temporarily attaches to a tray, table or other article in the restaurant. For example, when receiving his/her order, the customer can be provided with a portable audio player that includes a sound/headphone jack that the customer can clip onto his/her tray and plug headphones into to listen to the audio provided by the restaurant (whether it be stored in memory in the player or transmitted to the player).

FIG. 6 shows a more general exemplary system for providing audio content to restaurant customers wherein audio content is transmitted to receivers located in audio devices 100. In this system, customers 102 are seated at tables 104. The customers 102 have portable audio devices 100 that are provided by the restaurant at their tables 104. The portable audio devices 100 each include a receiver that receives audio content from a transmitter 106 that is associated with the restaurant (transmitter 106 may be inside or near the restaurant). In another embodiment, the portable audio devices include the audio content stored in their memory.

Figure 7:
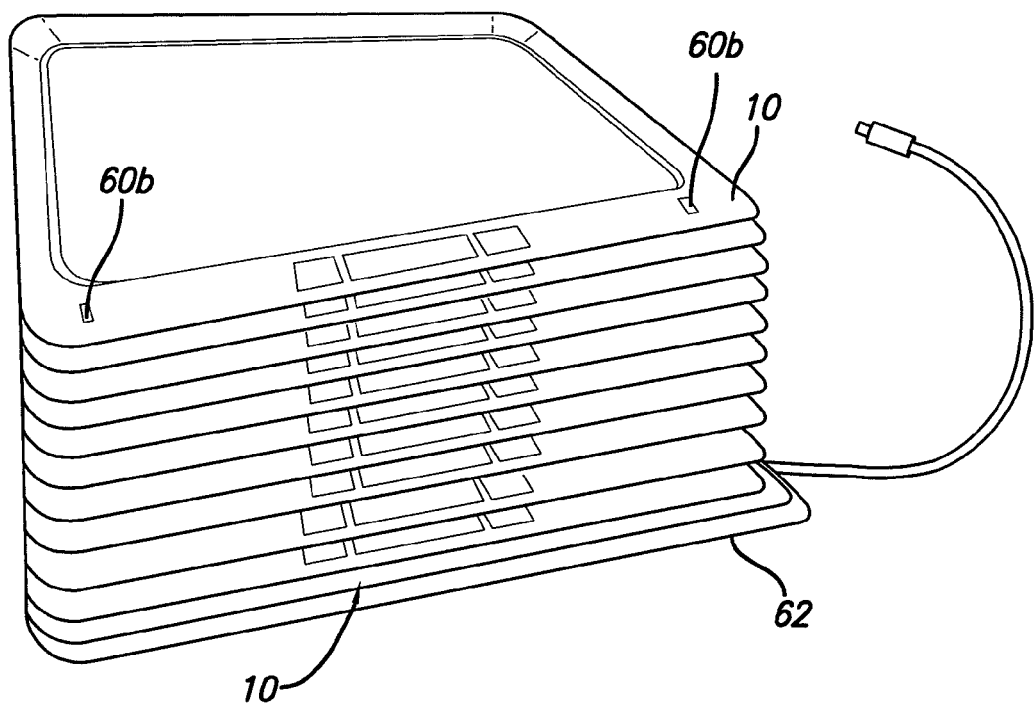
FIG. 7 is a perspective view of a plurality of the trays of FIG. 1 stacked together on a recharging stand in accordance with a preferred embodiment of the present invention.

As shown in the figures, the tray 10 can include at least one set of ± contacts or contact plates 60a in an embodiment that uses a rechargeable battery. As shown in FIG. 7, with the inclusion of contact plates 60a, the tray 10 is adapted to be placed on a recharging stand 62 that can be connected to an AC power source. In an alternative embodiment, the recharging stand 62 can include a DC power source. As shown in FIG. 2 in phantom, two contact plates 60a, which are in electrical communication with the rechargeable battery (power source 28) are located on the bottom of tray 10. This bottom set of contact plates 60 come into contact with corresponding contact plates on the recharging stand 62, which allows the battery to be charged.

In a preferred embodiment, the tray 10 also includes a second set of contact plates 60b on the top thereof (see FIG. 1). This allows multiple trays 10 to be stacked on top of one another to be charged simultaneously. When in a stack, the bottom set of contact plates 60a on one tray contact the top set of contact plates 60b on the tray underneath and so on. FIG. 7 shows a plurality of trays 10 stacked on one another for charging.

In an embodiment where the tray 10 includes bottom and top sets of contact plates 60a and 60b for parallel charging, two sets of wires are located inside the electronics portion 18. The first set of wires runs from the bottom contact plates 60a to the rechargeable battery, and the other set are the branch wires from the bottom contact plates 60a to the top contact plates 60b. The alignment feet 22 help to position the trays 10 when in a stack so that the contact plates 60a and 60b come into appropriate contact with one another.

Preferably the positive and negative terminal contact plates are located far from one another to prevent short circuiting. An inductor can also be used to help prevent short circuiting. Other forms of recharging known to those skilled in the art can also be used.

The tray 10 in general can also include other functions such as auto power off after a predetermined amount of time or when the earphones are removed from the jack, an LED for power indication, waterproof components, lights, nickel plated contacts, etc.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A serving tray, the serving tray comprising:
   a support surface for supporting items placed on the serving tray, the support surface having a periphery;
   a wall, the wall extending upwardly from the support surface, the wall having a lower edge and an upper edge, the lower edge connected to at least a portion of the periphery of the support surface, the upper edge being a specified distance above the support surface at the periphery;
   a flange, the flange extending outwardly away from the upper edge of the wall, the flange having an inner edge and an outer edge, the inner edge connected to the upper edge of the wall, the outer edge being a specified distance away from the upper edge of the wall;
   an electronic components housing connected to a bottom side of the flange, the electronics component housing for housing electronic components; and an audio player, the audio player including:
- a plurality of interoperating electronic components configured to emit sound, the electronic components housed within the electronic components housing;
- one or more controls for controlling the operation of the electronic components; and
- a power source for powering the electronic components.

2. The serving tray of claim 1, wherein the electronic components include a sound jack, at least a portion of the sound jack exposed within the wall or flange.

3. The serving tray of claim 1, wherein the power source comprises a rechargeable battery.

4. The serving tray of claim 3 further comprising a pair of contacts in electrical communication with the rechargeable battery.

5. The serving tray of claim 1, wherein the plurality of interoperating electronic components include a memory storing digital audio content and a signal processor for converting the stored digital audio content into analog sound signals.

6. The serving tray of claim 1, wherein the plurality of interoperating electronic components include a receiver for receiving an audio signal.

7. The serving tray of claim 6, wherein the receiver is configured to receive a signal that is transmitted from inside a restaurant.

8. The serving tray of claim 1, wherein the plurality of interoperating electronic components include a microprocessor for controlling other electronic components.

9. The serving tray of claim 1, wherein one or more controls for controlling the operation of the electronic components comprise one or more buttons integrated into a top side of the flange, the one or more buttons providing a user interface enabling a user to control operation of the audio player.

10. The serving tray of claim 1, wherein the power source comprises one or more solar panels.

11. The serving tray of claim 1, further comprising a display, the display for indicating the status of the audio player.

12. A serving tray recharging system, the serving tray recharging system comprising:
- a recharging stand, the recharging stand including a set of contacts, the recharging stand connected to an external power source;
- a plurality of serving trays, wherein each serving tray comprises:
  - a top side and a bottom side,
  - a wall that extends upwardly from the top side, the wall having a lower edge and an upper edge, the lower edge connected to at least a portion of a periphery of the top side, the upper edge being a specified distance above the top side at the periphery;
  - a flange that extends outwardly away from the upper edge of the wall, the flange having an inner edge and an outer edge, the inner edge connected to the upper edge of the wall, the outer edge being a specified distance away from the upper edge of the wall,
  - electronic components and a rechargeable battery for powering the electronic components,
  - an electronic components housing connected to a bottom side of the flange, the electronic component housing for housing the electronic components,
  - a first set of contacts on the bottom side, the first set of contacts electrically connected to the rechargeable battery, and
  - a second set of contacts on the top side, the second set of contacts electrically connected to the first set of contacts within the serving tray;
- wherein the first set of contacts included in each serving tray are configured such that when the serving tray is placed in the recharging stand, the first set of contacts are electrically connected to the set of contacts on the recharging stand to permit the external power source to charge the rechargeable battery of the serving tray; and
- wherein the second set of contacts included in each serving tray are configured such that when another serving tray is placed on the serving tray in the recharging stand, the second set of contacts are electrically connected to the first set of contacts of the other serving tray to permit the external power source to simultaneously charge the rechargeable battery of each serving tray in the recharging stand.

13. The serving tray recharging system of claim 12, wherein the electronic components of at least one of the plurality of serving trays are configured to emit sound.

* * * * *